(12) United States Patent
Sakaue et al.

(10) Patent No.: US 8,277,359 B2
(45) Date of Patent: Oct. 2, 2012

(54) AUTOMATIC TRANSMISSION AND ADJUSTING METHOD OF GAP IN AXIAL DIRECTION OF AUTOMATIC TRANSMISSION

(75) Inventors: Naohiro Sakaue, Hiroshima (JP); Tatsuhiko Iwasaki, Hiroshima (JP); Jun Nakamura, Hiroshima (JP); Narihito Hongawara, Hiroshima (JP); Katsutoshi Mukai, Hiroshima (JP)

(73) Assignee: Mazda Motor Corporation (JP)

( * ) Notice: Subject to any disclaimer, the term of this patent is extended or adjusted under 35 U.S.C. 154(b) by 610 days.

(21) Appl. No.: 12/500,341

(22) Filed: Jul. 9, 2009

(65) Prior Publication Data

US 2010/0081537 A1    Apr. 1, 2010

(30) Foreign Application Priority Data

Sep. 30, 2008    (JP) ................. 2008-252175

(51) Int. Cl.
*F16H 57/08* (2006.01)
*F16C 23/00* (2006.01)
*F16C 25/00* (2006.01)
*F16C 33/34* (2006.01)
*F16C 43/04* (2006.01)

(52) U.S. Cl. ........................ 475/331; 384/620
(58) Field of Classification Search ............... 475/331; 384/620
See application file for complete search history.

(56) References Cited

U.S. PATENT DOCUMENTS

| 4,725,153 | A | * | 2/1988 | Tsuruki ................ 384/620 |
| 4,730,517 | A |   | 3/1988 | Hamano et al. |
| 4,733,979 | A | * | 3/1988 | Tsuruki ................ 384/620 |
| 4,759,234 | A |   | 7/1988 | Premiski et al. |
| 4,883,374 | A | * | 11/1989 | Rhoads et al. ........ 384/618 |
| 5,810,694 | A |   | 9/1998 | Kamada et al. |
| 6,066,066 | A |   | 5/2000 | Collins et al. |
| 6,758,786 | B2 | * | 7/2004 | Lepelletier ............ 475/296 |
| 2008/0300095 | A1 | * | 12/2008 | Doi et al. ............ 475/276 |
| 2009/0088282 | A1 | * | 4/2009 | Iwasaki et al. ........ 475/159 |
| 2009/0215567 | A1 | * | 8/2009 | Iwasaki et al. ........ 475/116 |
| 2011/0009234 | A1 | * | 1/2011 | Heuver ................ 475/346 |

FOREIGN PATENT DOCUMENTS

| DE | 103 53 130 A1 | 6/2005 |
| EP | 0 237 743 A2 | 9/1987 |
| JP | H08-320058 A | 12/1996 |
| JP | 2000-55088 A | 2/2000 |
| JP | 2006-162048 A | 6/2006 |
| JP | 2007-078191 A | 3/2007 |

OTHER PUBLICATIONS

Translation of JP2006162048, Feb. 9, 2012.* Extended European Search Report dated Dec. 1, 2009; Application No. 09011624.5-2421.

* cited by examiner

*Primary Examiner* — Tisha Lewis
(74) *Attorney, Agent, or Firm* — Studebaker & Brackett PC; Donald R. Studebaker (57) ABSTRACT

An automatic transmission comprises a transmission mechanism including plural planetary gear sets, a transmission case storing the transmission mechanism, and an end cover closing an opening at one end of the transmission case. A planetary gear set disposed the closest to the end cover is assembled in such a manner that before the end cover is attached to the transmission case, a sun gear is assembled to the transmission case and a pinion carrier is assembled to the end cover. A thrust washer is disposed between an end face of the sun gear and an end face of an inner peripheral portion of the pinion carrier. The thrust washer is a member for adjusting a gap which is formed in an axial direction in the transmission case, and the member is selected from plural ones which have different axial thicknesses from each other.

12 Claims, 7 Drawing Sheets

FIG. 1

|  | 1st clutch (10) | 2nd clutch (20) | 1st brake (70) | 2nd brake (80) | 3rd brake (90) |
|---|---|---|---|---|---|
| 1st gear | O |  | (O) |  |  |
| 2nd gear | O |  |  | O |  |
| 3rd gear | O |  |  |  | O |
| 4th gear | O | O |  |  |  |
| 5th gear |  | O |  |  | O |
| 6th gear |  | O |  | O |  |
| R. gear |  |  | O |  | O |

AUTOMATIC TRANSMISSION AND ADJUSTING METHOD OF GAP IN AXIAL DIRECTION OF AUTOMATIC TRANSMISSION

BACKGROUND OF THE INVENTION

The present invention relates to an automatic transmission comprising a transmission mechanism including plural planetary gear sets, and an adjusting method of a gap in an axial direction of the automatic transmission.

In general, an automatic transmission for an automotive vehicle is manufactured by assembling a transmission mechanism, such as planetary gear sets, clutches, and brakes, to a cylindrical transmission case. Plural parts of the transmission mechanism are assembled in an axial direction through an opening of the transmission case located on a side opposite to a torque converter in a specified order, and eventually an end cover is disposed so as to close the opening of the transmission case. In case there is a partition wall to divide the inside of the transmission case into two parts in the axial direction, such parts may be assembled toward the partition wall in the axial direction from both sides. Accordingly, the more the parts number is, the longer the manufacturing time becomes.

In order to reduce the manufacturing time, some parts may be assembled outside the transmission case as a subassembly, then the subassembly may be assembled into the transmission case. For example, Japanese Patent Laid-Open Publication No. 2007-078191 discloses an automatic transmission in which some parts including brakes, pistons and so on are assembled to the end cover to form such a subassembly.

Herein, many parts of the transmission mechanism of the automatic transmission are disposed side by side in the axial direction, so an entire axial length may tend to be too long or too short. In case the entire axial length is too long, a gap between the parts becomes so narrow that the lubricating oil may not be supplied into the gap sufficiently, resulting in an increase of friction generated between the parts. Meanwhile, in case the entire axial length is too short, the gap between the parts becomes so wide that there may occur improper shaking of the parts. Thus, the performance or durability of the automatic transmission would deteriorate in the above-described cases.

Herein, an adjustment of such gap in the axial direction may be conducted by using a washer which may be selected from plural washers which have different axial thicknesses from each other in order to cope with the above-described problems.

Specifically, at first, all parts of the transmission mechanism are assembled into the transmission case in such a manner that those are put aside toward one side in the axial direction to make the gap between parts minimum. Then, the axial location of one member of parts which is located on the other side is measured, and a proper washer having the appropriate axial thickness is selected based on the difference between the above-described measured axial location and an axial location of the member which is in a use state at the operation of the transmission case, that is, based on total gaps between the parts during the operation of the transmission case, thereby properly adjusting the gaps between the parts in the axial direction at the operation of the transmission case.

According to the automatic transmission of the above-described patent publication, however, the parts of the transmission mechanism are assembled separately to the transmission case and the end cover, so that all of the parts are not assembled into the transmission case until the end cover closes the opening of the transmission case. Accordingly, the measurement of the gap in the axial direction could not be conducted. Thus, the adjustment of the gap in the axial direction by using the washer could not be conducted easily.

SUMMARY OF THE INVENTION

Accordingly, an object of the present invention is to provide an automatic transmission and an adjusting method of a gap in an axial direction of the automatic transmission which can easily conduct the gap adjustment.

According to the present invention, there is provided an automatic transmission, comprising a transmission mechanism including plural planetary gear sets, a transmission case storing the transmission mechanism therein, and an end cover closing an opening at one end of the transmission case, wherein one of the plural planetary gear sets which is disposed the closest to the end cover is assembled in such a manner that before the end cover is attached to the transmission case, a sun gear thereof is assembled to the transmission case and a pinion carrier thereof is assembled to the end cover, and a thrust bearing member is disposed between an end face of the sun gear and an end face of an inner peripheral portion of the pinion carrier, the thrust bearing member being a member for adjusting a gap which is formed in an axial direction in the transmission case, the member being selected from plural ones which have different axial thicknesses from each other.

According to the present invention, the thrust bearing member which is selected from plural ones which have different axial thicknesses from each other is disposed between the pinion carrier of the planetary gear set which is assembled to the end cover and the sun gear of the planetary gear set which is assembled to the transmission case. The proper gap can be easily provided in the transmission case by the properly selected thrust bearing member. Further, this thrust bearing member can be disposed without detaching the parts of the transmission mechanism including the pinion carrier which are assembled to the end cover or the parts of the transmission mechanism including the sun gear which are assembled to the transmission case.

According to an embodiment of the present invention, the thrust bearing member comprises a thrust bearing and a thrust washer, and the member for adjusting a gap is the thrust washer. Thereby, since the washer has a simple shape, it can be made easy to prepare the washers having different thicknesses, thereby easily adjusting the gap in the axial direction.

According to another embodiment of the present invention, the thrust bearing is disposed on a side of the sun gear, and the thrust washer is disposed on a side of the pinion carrier. Thereby, the thrust bearing having the constant thickness can be assembled to the transmission case in advance, so the axial gap for the selection of the proper washer can be measured easily.

According to another embodiment of the present invention, means for preventing the pinion carrier which has been assembled to the end cover from dropping off the end cover is provided. Thereby, the pinion carrier can be prevented by the means from dropping off the end cover when the end cover is attached to the transmission case which is disposed with its opening facing upward, thereby improving the assembling of the automatic transmission.

According to another embodiment of the present invention, the means is a piston cylinder which is disposed at a specified location on an outer peripheral side of the planetary gear set and stores a piston for pressing frictional elements of a brake device which is assembled into the end cover, an inner peripheral portion of the piston cylinder being located on a side of the transmission case at substantially the same position as an outer peripheral portion of the pinion carrier in a radial direction. Thereby, since the piston cylinder functions as the means for preventing the pinion carrier from dropping off, it may be unnecessary for any other additional member for preventing the pinion carrier from dropping off to be provided at the end cover.

According to another embodiment of the present invention, a recess portion is formed at the end face of the sun gear, and the thrust bearing member is stored in the recess portion. Thereby, the axial length of the automatic transmission can be made short.

According to another aspect of the present invention, there is provided an adjusting method of a gap in an axial direction of an automatic transmission which comprises a transmission mechanism including plural planetary gear sets, a transmission case storing the transmission mechanism therein, and an end cover closing an opening at one end of the transmission case, the method comprising steps of: before the end cover is attached to the transmission case, a sun gear of one of the plural planetary gear sets which is disposed the closest to the end cover being assembled to the transmission case and a pinion carrier thereof being assembled to the end cover; and when the end cover is attached to the transmission case, a thrust bearing member being disposed between an end face of the sun gear and an end face of an inner peripheral portion of the pinion carrier, wherein the thrust bearing member is a member for adjusting a gap which is formed in an axial direction in the transmission case, and the member is selected from plural ones which have different axial thicknesses from each other. The adjusting method of this aspect of the present invention can provide substantially the same functions and advantages as the above-described automatic transmission.

According to an embodiment of this aspect of the present invention, the transmission case and the end cover have contact faces to contact each other, the distance from the contact face of the transmission case to the end face of the sun gear and the distance from the contact face of the end cover to the end face of the inner peripheral portion of the pinion carrier are measured respectively, and the selection of the member of the thrust bearing member is selected based on the measurement of the distances. Thereby, the necessary measurements for the selection of the proper thrust bearing member can be conducted easily.

According to another embodiment of this aspect of the present invention, after the pinion carrier has been assembled to the end cover, a member to prevent the pinion carrier from dropping off the end cover is attached to the end cover, then the thrust bearing member is placed on the end face of the sun gear in a state in which the transmission case is disposed with the opening thereof facing upward, and the end cover is attached to the transmission case from above. Thereby, the end cover can be attached to the transmission case easily.

Other features, aspects, and advantages of the present invention will become apparent from the following description which refers to the accompanying drawings.

DETAILED DESCRIPTION OF THE INVENTION

Hereinafter, preferred embodiments of the present invention will be described.

Embodiment 1

Figure 1:
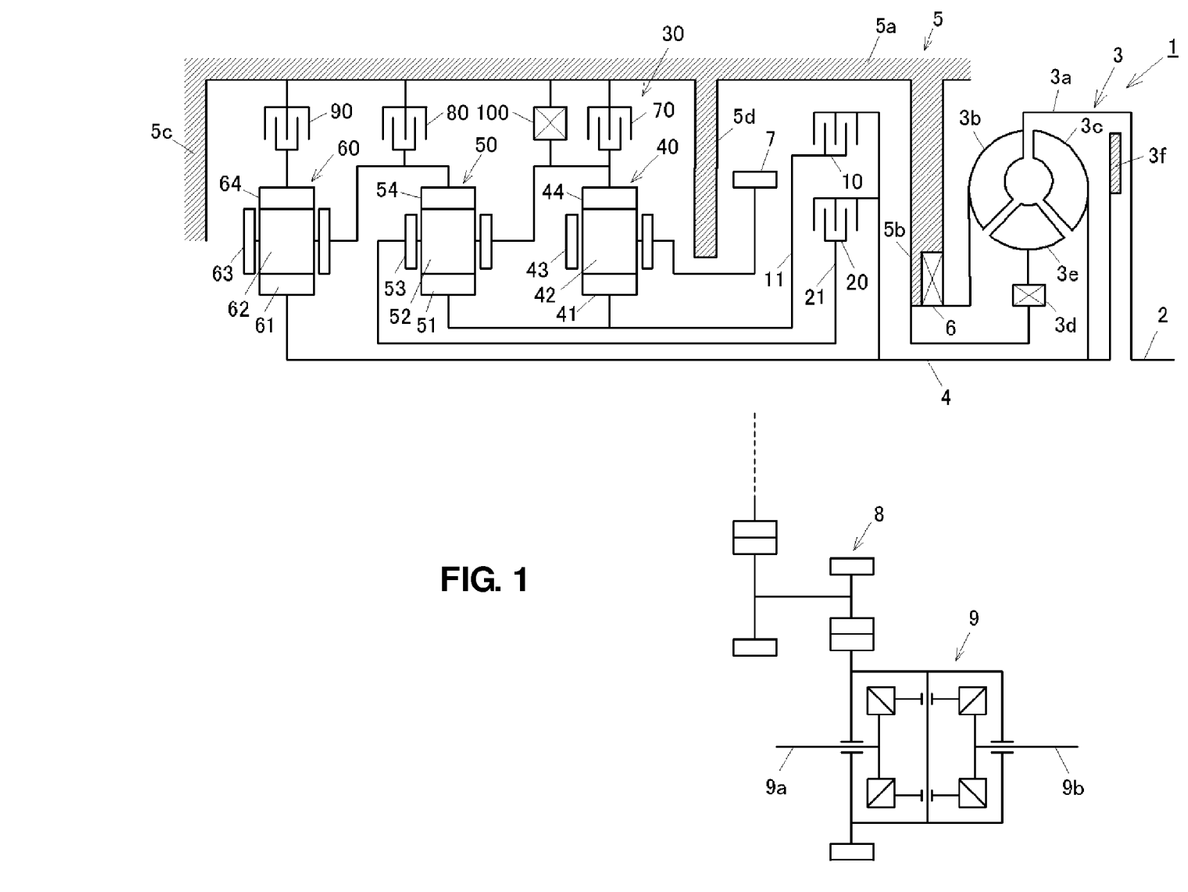
FIG. 1 is a skeleton diagram of an automatic transmission according to an embodiment of the present invention.

FIG. 1 is a skeleton diagram of an automatic transmission according to an embodiment of the present invention. The present automatic transmission 1, which is applied to an automotive vehicle with a laterally disposed engine, such as a front-engine front-drive type of vehicle, comprises a torque converter 3 attached to an engine output shaft 2, a first clutch 10 and a second clutch 20 to which a power from the torque converter 3 is inputted via an input shaft 4, and a transmission mechanism 30 to which the power is inputted from one of or both of the clutches 10, 20. These elements are stored in a transmission case 5 and disposed on an axis of the input shaft 4.

The transmission case 5 comprises a body portion 5a which forms an outer periphery, a front (torque-converter side) wall 5b which stores an oil pump 6 therein which is driven by an engine via the torque converter 3, an end cover 5c which covers an opening at a rear (anti torque-converter side) end portion of the body portion 5a, and a middle wall 5d which is provided at a middle portion of the body portion 5a.

The first and second clutches 10, 20 are stored between the front wall 5b and the middle wall 5d, and the transmission mechanism 30 is stored between the middle wall 5d and the end cover 5c. An output gear 7 to take out the power from the transmission mechanism 30 is disposed between the clutches 10, 20 and the middle wall 5d. The power taken out by the output gear 7 is transmitted to a differential gear 9 via a counter drive mechanism 8, thereby driving right and left drive axels 9a, 9b.

The torque converter 3 comprises a case 3a which is connected to the engine output shaft 2, a pump 3b which is fixed in the case 3a, a turbine 3c which is disposed so as to face to the pump 3b and driven by the pump 3b with operational oil, a stator 3e which is provided between the pump 3b and the turbine 3c and supported at the transmission case 5 via a one-way clutch 3d so as to achieve a torque increase function, and a lockup clutch 3f which is provided between the case 3a and the turbine 3c and connects the engine output shaft 2 to the turbine 3c directly via the case 3a. Thereby, the rotation of the turbine 3c is transmitted to the first and second clutches 10, 20 and the transmission mechanism 30 via the input shaft 4.

The transmission mechanism 30 comprises first, second and third planetary gear sets 40, 50, 60 (hereinafter, referred to as "first, second and third gear sets"). These gear sets 40, 50, 60 are disposed between the middle wall 5d and the end cover 5c in the transmission case 5 in this order from the front side.

Further, in addition to the first and second clutches 40, 50, a first brake 70, a second brake 80, and a third brake 90, as frictional elements of the transmission mechanism 30, are disposed in this order from the front side. Further, a one-way clutch 100 is disposed beside the first brake 70.

The first, second and third gear sets 40, 50, 60, which are a single pinion type of planetary gear set, respectively comprise sun gears 41, 51, 61, plural pinions 42, 52, 62 to engage with the sun gears 41, 51, 61, carriers (pinion carries) 43, 53, 63 to support the pinions 42, 52, 62 respectively, and ring gears 44, 54, 64 to engage with the pinions 42, 52, 62.

The input shaft 4 is connected to the sun gear 61 of the third gear set 60. The sun gear 41 of the first gear set 40 and the sun gear 51 of the second gear set 50, the ring gear 44 of the first gear set 40 and the carrier 53 of the second gear set 50, and the ring gear 54 of the second gear set 50 and the carrier 63 of the third gear set 60 are connected, respectively. The output gear 7 is connected to the carrier 43 of the first gear set 40.

The sun gear 41 of the first gear set 40 and the sun gear 51 of the second gear set 50 are connected to an output shaft 11 of the first clutch 10 and then connected to the input shaft 4 via the first clutch 10. The carrier 53 of the second gear set 50 is connected to an output shaft 21 of the second clutch 20 and then connected to the input shaft 4 via the second clutch 20.

Further, the ring gear 44 of the first gear set 40 and the carrier 53 of the second gear set 50 are connected to the transmission case 5 via the first brake 70 and the one-way clutch 100. The ring gear 54 of the second gear set 50 and the carrier 63 of the third gear set 60 are connected to the transmission case 5 via the second brake 80. The ring gear 64 of the third gear set 60 is connected to the transmission case 5 via the third brake 90.

The automatic transmission 1 having the above-described structure achieves shifts for the six-forward gears and a reverse gear by combination of connection of the first and second clutches 10, 20 and the first, second and third brakes 70, 80, 90. Relationships between the combination and the selected gears are shown by a connection table of FIG. 2.

Figure 2:
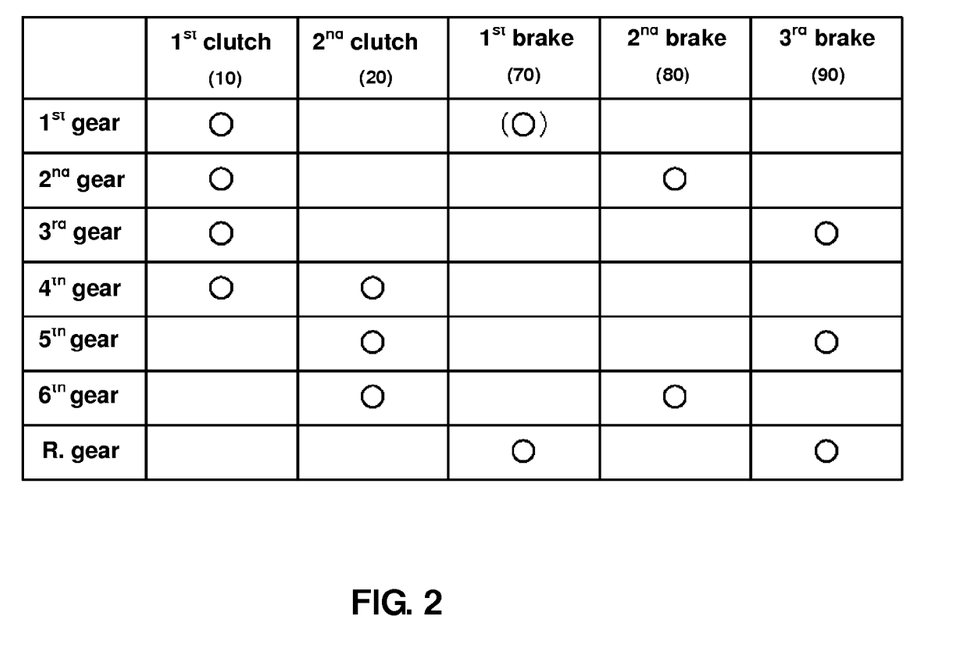
FIG. 2 is a connection table of the automatic transmission of FIG. 1.

That is, the first clutch 10 and the first brake 70 are connected to each other in the first gear, where the rotation of the input shaft 4 is inputted to the sun gear 41 of the first gear set 40 with a great speed reduction by the first gear set 40, and then outputted from the carrier 43 of the first gear set 40 to the output gear 7. Herein, the first brake 70 is connected only in the first gear state where the engine brake works. In the first gear state where the engine brake does not work, the one-way clutch 100 is locked up for accomplishing the first gear.

In the second gear, the first clutch 10 and the second brake 80 are connected to each other, where the rotation of the input shaft 4 is inputted to the sun gear 41 of the first gear set 40 and at the same time inputted to the ring gear 44 of the first gear set 40 via the second gear set 50 with a smaller ratio of speed reduction than the first gear, and then outputted from the carrier 43 of the first gear set 40 to the output gear 7.

In the third gear, the first clutch 10 and the third brake 90 are connected to each other, where the rotation of the input shaft 4 is inputted to the sun gear 41 of the first gear set 40 and at the same time inputted to the ring gear 44 of the first gear set 40 via the third gear set 60 and the second gear set 50 with a smaller ratio of speed reduction than the second gear, and then outputted from the carrier 43 of the first gear set 40 to the output gear 7.

In the fourth gear, the first clutch 10 and the second clutch 20 are connected to each other, where the rotation of the input shaft 4 is inputted to the sun gear 41 of the first gear set 40 and at the same time inputted to the ring gear 44 of the first gear set 40 via the second gear set 50 directly. Thereby, the whole first gear set 40 rotates along with the input shaft 4, so that the rotation of the input shaft 4 is outputted from the carrier 43 to the output gear 7 with the speed reduction ratio of 1.

In the fifth gear, the second clutch 20 and the third brake 90 are connected to each other, where the rotation of the input shaft 4 is inputted to the ring gear 44 of the first gear set 40 via the second gear set 50 directly and at the same time inputted to the sun gear 41 of the first gear set 40 via the third gear set 630 and the second gear set 50. Thereby, the rotation of the input shaft 4 is outputted from the carrier 43 of the first gear set 40 to the output gear 7 with the speed increase.

In the sixth gear, the second clutch 20 and the second brake 80 are connected to each other, where the rotation of the input shaft 4 is inputted to the ring gear 44 of the first gear set 40 via the second gear set 50 directly and at the same time inputted to the sun gear 41 of the first gear set 40 via the second gear set 50. Thereby, the rotation of the input shaft 4 is outputted from the carrier 43 of the first gear set 40 to the output gear 7 with a greater speed increase ratio than the fifth gear.

Further, in the reverse gear, the first brake 70 and the third brake 90 are connected, where the rotation of the input shaft 4 is inputted to the sun gear 41 of the first gear set 40 via the second gear set 60 and the third gear set 50. Herein, the rotational direction is reversed by the second gear set 50, so that the rotation of the input shaft 4 is outputted from the carrier 43 of the first gear set 40 to the output gear 7 with a reverse rotation.

As described, the transmission mechanism 30 which comprises two clutches 10, 20, three single-pinion type of planetary gear sets 40, 50, 60 and three brakes 70, 80, 90 materializes the automatic transmission 1 which achieves shifts for the six-forward gears and the reverse gear with these components.

Hereinafter, the adjustment of the gap in the axial direction in the transmission case according to the present invention will be described referring to the sectional view of the automatic transmission of FIG. 3.

Figure 3:
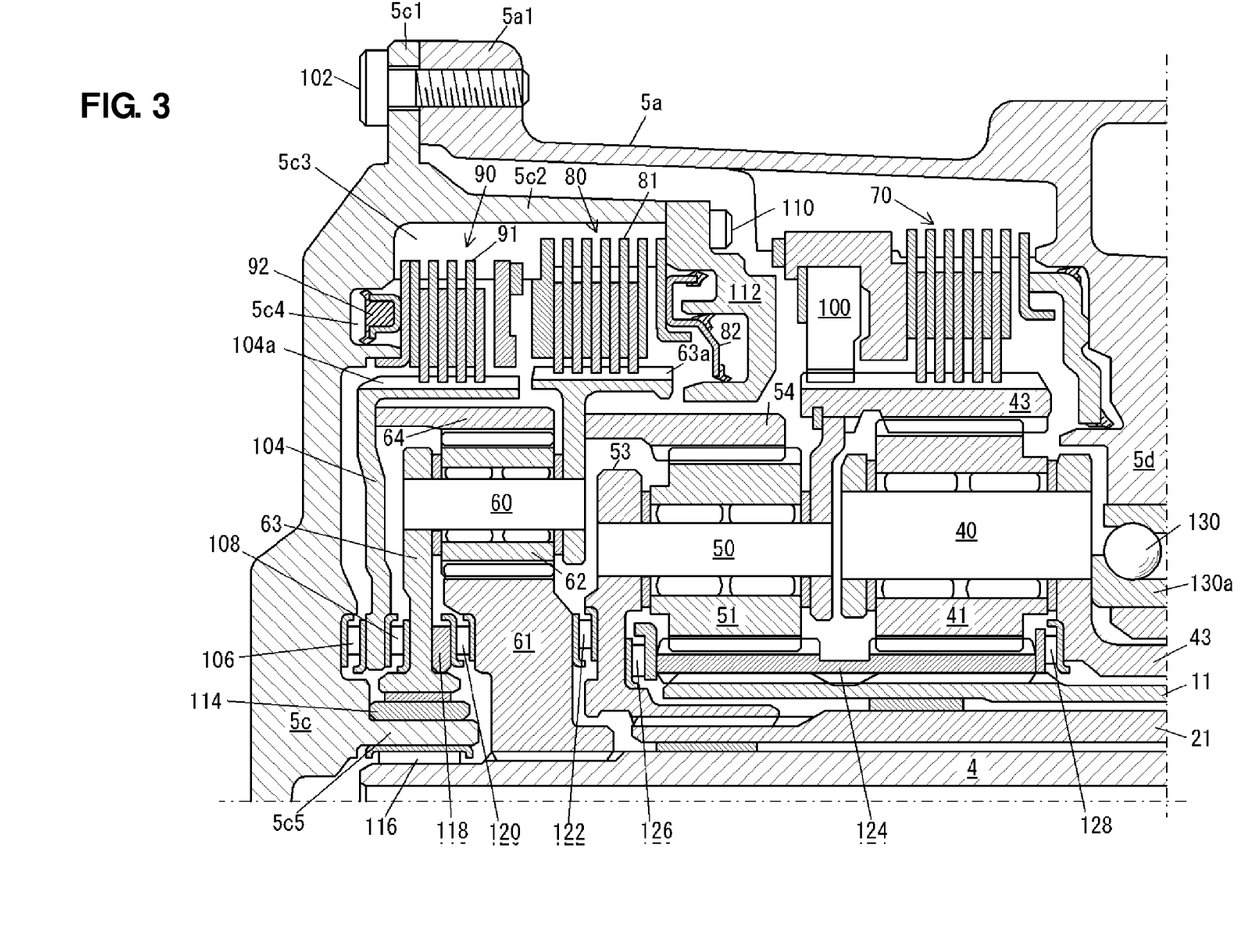
FIG. 3 is a sectional view of a part of the automatic transmission in which an adjustment of a gap in an axial direction is conducted according to the present invention.

FIG. 3 shows a part of the automatic transmission between the middle wall 5d of the transmission case 5 and the end cover 5c, where the adjustment in the axial direction is conducted.

The end cover 5c is of a substantially cylindrical shape having a bottom as shown and has a flange portion 51c at its rear-side outer periphery. The end cover 5c is fixed to the body portion 5a of the transmission case 5 with bolts 102 at the flange portion 51c.

Further, the end cover 5c constitutes a subassembly together with two brakes 80, 90 and a part of elements of the gear seat 60 which is located the closest to the end cover 5c, which are assembled to the end cover 5c.

The two brakes 80, 90 are multi-plate clutches with plural frictional plates 81, 91. Parts of the respective plural frictional plates 81, 91 engage with a spline tooth 5c3 which is formed at an inner periphery of a cylindrical portion 5c2 of the end cover 5c via a spline connection. The rest of the plural frictional plates 81 engage with a spline tooth 63a which is formed at the carrier (front-side) 63 of the gear set 60 via the spline connection. The rest of the plural frictional plates 91 engage with a spline tooth 104a which is formed at an outer periphery of a transmission member 102 which is of a substantially cylindrical shape having a bottom and fixed to a rear end of the ring gear 64 of the gear set 60.

Herein, an inner peripheral portion of the transmission member 104 is supported in the axial direction by a thrust bearing 106 which is disposed on the side of the end cover 5c and a thrust bearing 108 which is disposed on the side of the inner peripheral portion of the carrier (rear-side) 63.

Further, a piston 82 of the brake 80 is supported at a piston cylinder 112 which is fixed to a front-side end of the cylindrical portion 5c2 of the end cover 5c by a bolt 110 so as to slide in the axial direction. Meanwhile, a piston 92 of the brake 90 is supported at a ring-shaped groove 5c4 which is formed at the end cover 5c so as to slide in the axial direction.

Figure 4:
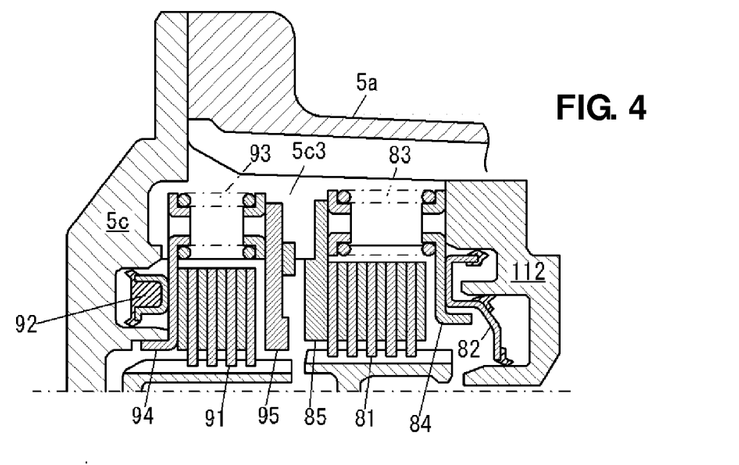
FIG. 4 is a sectional view of another part at a different location in a peripheral direction from FIG. 3.

A return spring 83 of the brake 80, as shown in FIG. 4 which is a sectional view of another part at a different location in a peripheral direction from FIG. 3, is disposed on an outer peripheral side of the plural frictional plates 81 in such a manner that one end of that is supported at a spring support plate 84 which is provided between the frictional plate 81 disposed the closest to the piston and the piston 82 and the other end of that is supported at a retaining plate 85 which is provided on the opposite side from the plural frictional plates 81. The spring support plate 84 engages with the spline tooth 5c3 via the spline connection so as to move in the axial direction, and the retaining plate 85 engages with the spline tooth 5c3 via the spline connection in a state in which its move toward the rear side beyond a specified position is limited.

A return spring 93 of the brake 90 is disposed on an outer peripheral side of the plural frictional plates 91 in such a manner that one end of that is supported at a spring support plate 94 which is provided between the frictional plate 91 disposed the closest to the piston and the piston 92 and the other end of that is supported at a retaining plate 95 which is provided on the opposite side from the plural frictional plates 91. The spring support plate 94 engages with the spline tooth 5c3 via the spline connection so as to move in the axial direction, and the retaining plate 95 engages with the spline tooth 5c3 via the spline connection in a state in which its move toward the rear side beyond a specified position is limited.

Returning to FIG. 3, the gear set 60, pinion 62, carrier 63 and ring gear 64 are assembled to the end cover 5c as a unit. Specifically, they are assembled in a state in which the inner periphery of the carrier 63 (rear-side) is supported via a radial bearing 114 at a boss portion 5c5 which is formed at a central portion of the end cover 5c and projects toward the front side. This boss portion 5c5 is of a cylindrical shape and supports a rear-side end of the input shaft 4 via a radial bearing 116.

The outer peripheral portion of the carrier (front-side) 63 and the inner peripheral portion of the piston cylinder 112 are disposed side by side in the axial direction, that is, they are located almost at the same position in the radial direction. Accordingly, once the piston cylinder 112 is attached to the cylindrical portion 5c2 of the end cover 5c, the elements of the gear set 60 except the sun gear 61 cannot be detached from the end cover 5c. In other words, the piston cylinder 112 functions as a means for preventing those elements from dropping off. Thus, any other additional member as such means may be unnecessary.

The sun gear 61 of the gear set 60 which is not assembled to the end cover 5c is supported in the axial direction by a washer for adjusting the gap in the axial direction (thrust washer) 118 and a thrust bearing 120, which are disposed on the side of the carrier (rear-side) 63 and a thrust bearing 122 which is disposed on the side of the carrier (rear-side) 53 of the gear set 50.

Further, a recess portion is formed at the end face of the sun gear 61, and the thrust bearing 120 is stored in the recess portion. That is, the sun gear 61 is formed so as to store the bearing 120 on the inside (front-side) from the rear-side end face. Thereby, the sun gear 61 and the thrust bearing 120 are disposed in a space which has a shorter length than the total of the axial lengths. Consequently, the axial length of the automatic transmission can be made properly short.

Only the ring gear 54 of the gear set 50, a rear-side end of which is fixed to the carrier (front-side) 63 of the gear set 60, is assembled to the end cover 5c as the assembly. The elements of the gear set 50 except the ring gear 54 are assembled to the body portion 5a of the transmission case 5 before the end cover 5c is attached. The inner peripheral portion of the carrier (rear-side) 53 is supported in the axial direction by the thrust bearing 122 and a thrust bearing 126 which is disposed on the side of a rear-side end of a transmission member 124 which interconnects the sun gear 51 of the gear set 50 and the sun gear 41 of the gear set 40 to transmit the power.

The gear set 40, which has no element to be assembled to the end cover 5c as the subassembly, is assembled to the body portion 5a of the transmission case 5 before the end cover 5c is attached. The carrier (front-side) 43 of the gear set 40 is supported in the axial direction by a thrust bearing 128 which is disposed on the side of a front-side end of the transmission member 124 and an inner lace 130a of a radial bearing 130.

The brake 70 and the one-way clutch 100 are assembled between the body portion 5a and the gear set 40.

Hereinafter, the adjustment of the gap in the axial direction according to the present invention will be described.

Herein, the adjustment of the gap in the axial direction according to the present invention means providing the proper gaps between the parts of the transmission mechanism which are disposed side by side in the axial direction. In the present embodiment, the gap between the end cover 5c and the transmission member 104, the gap between the transmission member 104 and the carrier (rear-side) 63 of the gear set 60, the gap between the carrier (rear-side) 63 and the sun gear 61 of the gear set 60, the gap between the sun gear 61 and the carrier (rear-side) 53 of the gear set 50, the gap between the carrier 53 and the transmission member 124, the gap between the transmission member 124 and the carrier (front-side) 43 of the gear set 40, and the gap between the carrier 43 and the inner lace 130a of the radial bearing 130 are made proper respectively. In other words, the respective thrust bearings 106, 108, 120, 122, 126 and 128, which are disposed at the respective gaps except the gap between the carrier 43 and the inner lace 130a of the radial bearing 130 which contact each other directly, are made move smoothly without improperly shaking.

Specifically, in order to provide the proper gaps in the axial direction, a proper washer having the appropriate axial thickness is selected from the plural washers which have different axial thicknesses from each other as the washer for adjusting the gap in the axial direction 118 shown in FIG. 3.

Hereinafter, the method of selecting the proper washer having the appropriate axial thickness will be described.

Figure 5:
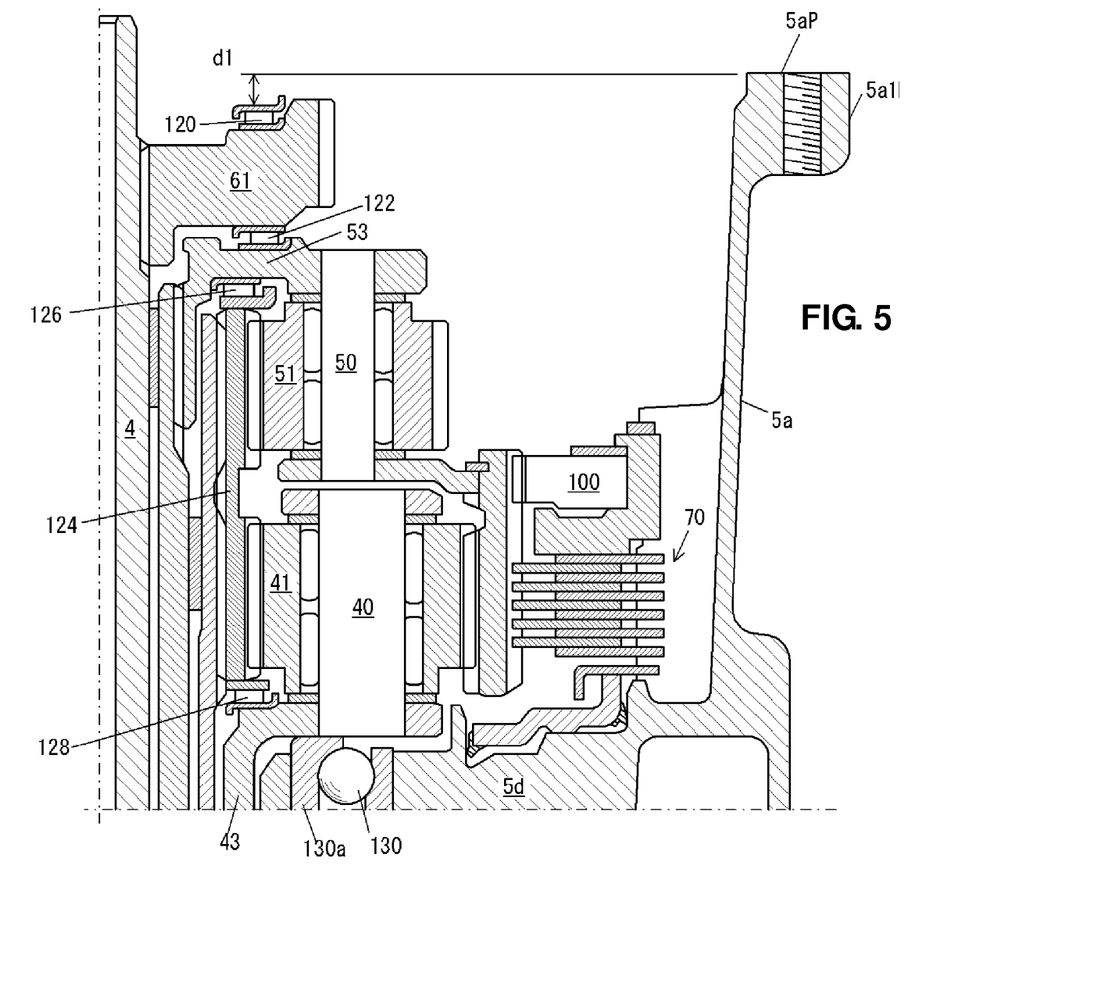
FIG. 5 is a view to explain a measurement for selecting a thrust washer for adjusting a gap in the axial direction.

At first, as shown in FIG. 5, the body portion 5a of the transmission case 5 to which the brake 70, one-way clutch 100, gear set 40, gear set 50 without the ring gear 54, sun gear 61 of the gear set 60, thrust bearings 120, 122, 126 and 128, and transmission member 124 are assembled is disposed with its rear-side opening facing upward.

Herein, since the axial direction of the automatic transmission becomes substantially identical to the vertical direction, the gap between the sun gear 61 and the carrier 53, the gap between the carrier 53 and the transmission member 124, and the gap between the transmission member 124 and the carrier 43 can be made minimum in a natural state (without an excessive contact pressure) respectively, having the thrust bearings 122, 126 and 128 therein respectively which are disposed so as to move smoothly without shaking. The gap between the carrier 43 and the inner lace 130a of the radial bearing 130 which has no thrust bearing therein becomes minimum in the natural state.

In this state the axial distance d1 between the rear-side end face of the thrust bearing 120 which is disposed on the rear-side end face of the sun gear 61 and a contact pace 5aP of the flange portion 5a1 of the transmission case 5a is measured.

Figure 6:
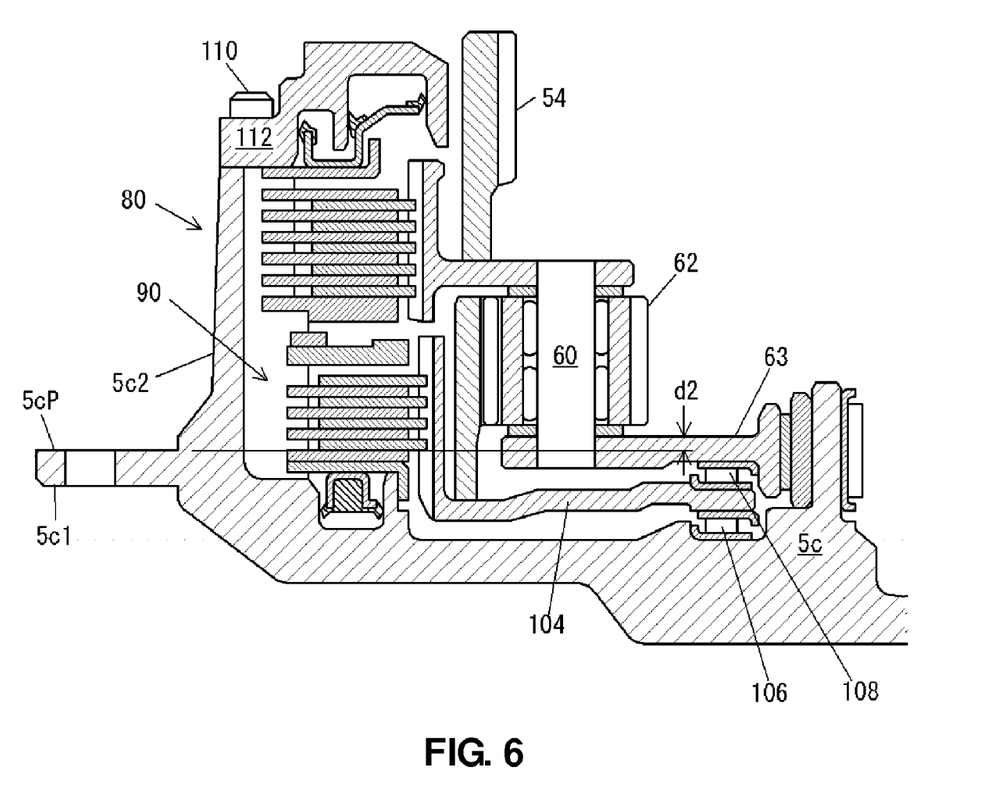
FIG. 6 is a view to explain another measurement for selecting the thrust washer for adjusting the gap in the axial direction.

Meanwhile, as shown in FIG. 6, the assembly of the end cover 5c is disposed with its front side facing upward.

Herein, since the axial direction of the automatic transmission becomes substantially identical to the vertical direction, the gap between the end cover 5c and the transmission member 104 and the gap between the transmission member 104 and the carrier (rear-side) 63 of the gear set 60 can be made minimum in the natural state respectively, having the thrust bearings 106 and 108 therein respectively which are disposed so as to move smoothly without shaking. The gap between the carrier 43 and the inner lace 130a of the radial bearing 130 which has no thrust bearing therein becomes minimum in the natural state.

In this state the axial distance d2 between the front-side end face of the carrier (rear-side) 63 of the gear set 60 and a contact pace 5cP of the flange portion 5c1 of the end cover 5c is measured.

The contact face 5aP of the flange portion 5a1 of the body portion 5a of the transmission case 5 shown in FIG. 5 and the contact face 5cP of the flange portion 5c1 of the end cover 5c shown in FIG. 6 are made contact each other when the end cover 5c is attached to the body portion 5a as shown in FIG. 3. Based on the distances d1 and d2 measured, the axial length of the gap between the carrier (rear-side) 63 of the gear set 60 and the thrust bearing 120 in case the end cover 5c is attached to the body portion 5a of the transmission case 5 is calculated keeping the state in which the gap is minimum.

The proper washer having the appropriate axial thickness is selected based on the calculated axial length of the gap between the carrier (rear-side) 63 and the thrust bearing 120. That is, the proper washer which can make the calculated axial length of the gap between the carrier (rear-side) 63 and the thrust bearing 120 identical to the total length of the proper gaps between the parts is selected.

The selected washer is provided in the gap between the carrier (rear-side) 63 and the thrust bearing 120, thereby providing the proper gap between them.

Figure 7:
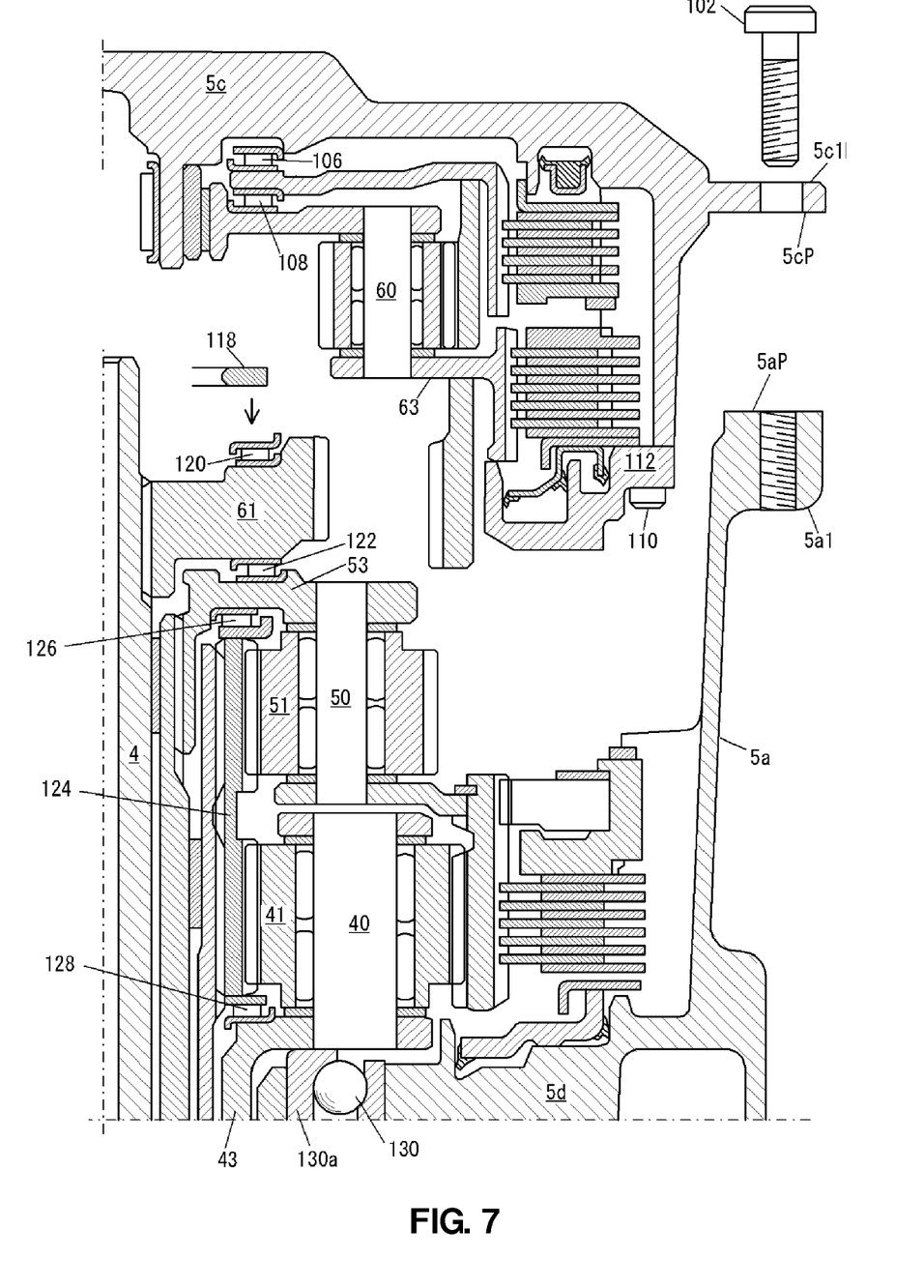
FIG. 7 is a view to show a state in which an end cover is attached to a body portion of a transmission case with the thrust washer disposed.

Once the washer 118 is selected, as shown in FIG. 7, it is placed on the rear-side end face of the thrust bearing 120 assembled to the body portion 5a of the transmission case 5 with its opening facing upward. Then, the subassembly of the end cover 5c with its front side facing upward is disposed above the body portion 5a, and lowered toward the body portion 5a.

Herein, as shown in FIG. 7, the gear set 60 and others assembled to the end cover 5c are received by the piston cylinder 112 so that they are prevented from dropping off the end cover 5c. That is, the end cover 5c can be attached easily to the body portion 5a of the transmission case 5 with its opening facing upward by the piston cylinder 112.

After the subassembly of the end cover 5c is placed onto the opening of the body portion 5a of the transmission case 5, that is, the both contact faces 5cP, 5aP contact each other, the end cover 5c is fixed to the body portion 5a with the bolt 102. Thereby, the washer 118 can provide the proper gap in the axial direction inside the transmission case 5.

According to the present embodiment, the thrust bearing 120 and the washer 118 which is selected from plural ones which have different axial thicknesses from each other are disposed between the pinion carrier 63 of the gear set 60 assembled to the end cover 5c and the sun gear 61 of the gear set 60 assembled to the body portion 5a of the transmission case 5. The proper gap can be easily provided in the transmission case 5 by the properly selected washer 118. Further, this washer 118 can be disposed without detaching the parts of the transmission mechanism 30 including the carrier 63 which are assembled to the end cover 5c or the parts of the transmission mechanism 30 including the sun gear 61 which are assembled to the body portion 5a of the transmission case 5.

Further, the distance d1 from the contact face 5aP of the body portion 5a1 of the transmission case 5 to the rear-side end face of thrust bearing 120 disposed on the rear-side end face of the sun gear 61 and the distance d2 from the contact face 5cP of the end cover 5c to the front-side end face of the inner peripheral portion of the carrier (rear-side) 63 are measured respectively, and the selection of the washer 118 which can provide the proper gap in the axial direction inside the transmission case 5 is selected based on the measurement of the distances. Thereby, the necessary measurements for the selection of the proper washer 118 can be conducted easily without attaching the end cover 5c to the body portion 5a of the transmission case 5.

Moreover, the adjustment of the gap in the axial direction is conducted by the washer selected from the plural ones having the different axial thicknesses. The washer has a simple shape, so it can be made easy to prepare the washers having different thicknesses, thereby easily adjusting the gap in the axial direction.

While the thrust bearing id disposed on the side of the sun gear and the thrust washer is disposed on the side of the pinion carrier in the above-described embodiment, they may be disposed reversely. In this case, the measurement d1 from the contact face 5aP of the body portion 5a of the transmission case 5 to the rear-side end face of the thrust bearing 120 as shown in FIG. 5 should not be conducted, but the distance from the contact face 5aP to the rear-side end face of the sun gear 61 is necessary. Further, the selection of the thrust washer may be necessary considering the axial thickness of the thrust bearing.

Embodiment 2

While the thrust washer 118 and the thrust bearing 120 are disposed side by side to adjust the gap in the axial direction in the above-described embodiment shown in FIG. 3, this adjustment may be conducted only by the thrust bearing disposed in the gap between the pinion carrier of the planetary gear set which is assembled to the end cover and the sun gear of the planetary gear set which is assembled to the transmission case, without using the thrust washer. In this different embodiment, plural thrust bearings having the different axial thicknesses need to be prepared, and a proper thrust bearing is selected from those.

Figure 8:
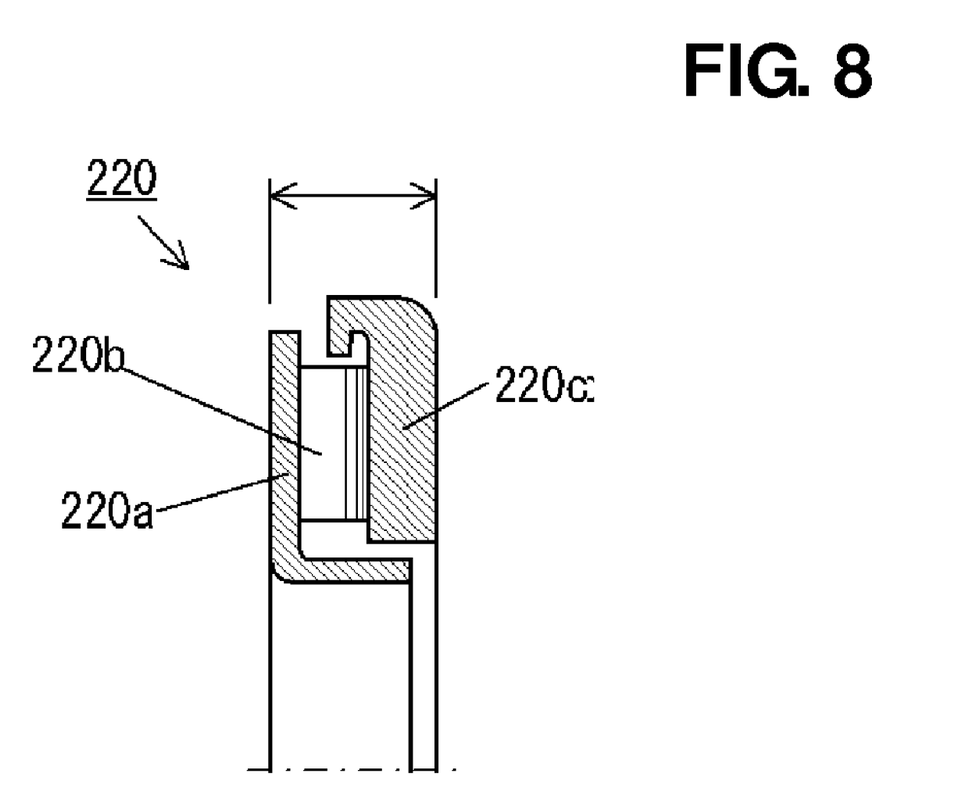
FIG. 8 is a view to show another embodiment of the thrust washer for adjusting the gap in the axial direction.

In this second embodiment, a thrust bearing 220, as shown in FIG. 8, may comprise a roller 220b and a pair of laces 220a, 220c, in which the lace 220c is to be selected from plural prepared laces which have different axial thicknesses.

The present invention should not be limited to the above-described embodiments, and any other modifications and improvements may be applied within the scope of a sprit of the present invention.

What is claimed is:

1. An automatic transmission, comprising:
    a transmission mechanism including plural planetary gear sets;
    a transmission case storing the transmission mechanism therein; and
    an end cover closing an opening at one end of the transmission case,
    wherein one of said plural planetary gear sets which is disposed the closest to said end cover is assembled in such a manner that before the end cover is attached to said transmission case, a sun gear thereof is assembled to the transmission case and a pinion carrier thereof is assembled to the end cover, then a thrust bearing member is disposed between an end face of said sun gear assembled to the transmission case and an end face of an inner peripheral portion of said pinion carrier assembled to the end cover, and finally said end cover with the assembled pinion carrier is attached to said transmission case with the assembled sun gear, the thrust bearing member being a member for adjusting a gap which is formed in an axial direction in the transmission case, said member being selected from plural ones which have different axial thicknesses from each other, and means for preventing the pinion carrier which has been assembled to the end cover from dropping off the end cover is provided, said means being a piston cylinder which is disposed at a specified location on an outer peripheral side of said planetary gear set and stores a piston for pressing frictional elements of a brake device which is assembled into the end cover, an inner peripheral portion of the piston cylinder being located on a side of the transmission case at substantially the same position as an outer peripheral portion of the pinion carrier in a radial direction.

2. The automatic transmission of claim 1, wherein said thrust bearing member comprises a thrust bearing and a thrust washer, and said member for adjusting a gap is the thrust washer.

3. The automatic transmission of claim 2, wherein said thrust bearing is disposed on a side of the sun gear, and said thrust washer is disposed on a side of the pinion carrier.

4. The automatic transmission of claim 1, wherein a recess portion is formed at said end face of the sun gear, and said thrust bearing member is stored in the recess portion.

5. An adjusting method of a gap in an axial direction of an automatic transmission which comprises a transmission mechanism including plural planetary gear sets, a transmission case storing the transmission mechanism therein, and an end cover closing an opening at one end of the transmission case, the adjusting method comprising:

before said end cover is attached to said transmission case, assembling a sun gear of one of said plural planetary gear sets which is disposed the closest to said end cover to the transmission case and assembling a pinion carrier thereof to the end cover;

disposing a thrust bearing member between an end face of said sun gear assembled to the transmission case and an end face of an inner peripheral portion of said pinion carrier assembled to the end cover; and attaching said end cover having the pinion carrier assembled thereto to said transmission case having the sun gear assembled thereto via said disposed thrust bearing member, wherein the thrust bearing member is a member for adjusting a gap which is formed in an axial direction in the transmission case, and the member is selected from plural ones which have different axial thicknesses from each other.

6. The adjusting method of a gap in an axial direction of an automatic transmission of claim 5, wherein said transmission case and said end cover have contact faces to contact each other, the distance from the contact face of the transmission case to said end face of the sun gear and the distance from the contact face of the end cover to said end face of the inner peripheral portion of the pinion carrier are measured respectively, and said selection of the member of the thrust bearing member is selected based on said measurement of the distances.

7. The adjusting method of a gap in an axial direction of an automatic transmission of claim 6, wherein after said pinion carrier has been assembled to said end cover, a member to prevent the pinion carrier from dropping off the end cover is attached to the end cover, then said thrust bearing member is placed on said end face of the sun gear in a state in which the transmission case is disposed with the opening thereof facing upward, and the end cover is attached to the transmission case from above.

8. The adjusting method of a gap in an axial direction of an automatic transmission of claim 7, wherein said thrust bearing member comprises a thrust bearing and a thrust washer, and said member for adjusting a gap is the thrust washer.

9. The adjusting method of a gap in an axial direction of an automatic transmission of claim 8, wherein said thrust bearing is disposed on a side of the sun gear, and said thrust washer is disposed on a side of the pinion carrier.

10. The adjusting method of a gap in an axial direction of an automatic transmission of claim 5, wherein after said pinion carrier has been assembled to said end cover, a member to prevent the pinion carrier from dropping off the end cover is attached to the end cover, then said thrust bearing member is placed on said end face of the sun gear in a state in which the transmission case is disposed with the opening thereof facing upward, and the end cover is attached to the transmission case from above.

11. The adjusting method of a gap in an axial direction of an automatic transmission of claim 10, wherein said thrust bearing member comprises a thrust bearing and a thrust washer, and said member for adjusting a gap is the thrust washer.

12. The adjusting method of a gap in an axial direction of an automatic transmission of claim 11, wherein said thrust bearing is disposed on a side of the sun gear, and said thrust washer is disposed on a side of the pinion carrier.

* * * * *